3,567,708
PROCESS FOR THE PREPARATION OF FIBROUS WATER-INSOLUBLE CELLULOSE SULFATE SALTS
James H. Manning, Suffern, N.Y., and James W. Atkins and McDonald Moore, Mobile, Ala., assignors to International Paper Company, New York, N.Y.
No Drawing. Filed Aug. 25, 1969, Ser. No. 852,887
Int. Cl. C08b 5/14
U.S. Cl. 260—215                 9 Claims

ABSTRACT OF THE DISCLOSURE

A process for producing a flame-resistant, water-insoluble, cellulose sulfate salt which comprises a sulfating step employing dimethyl sulfoxide or a dimethyl sulfoxide-dimethyl formamide mixture in the presence of sulfur trioxide in complex with a Lewis base, a neutralization step, a water-washing step and a de-swelling step using a salt containing a polyvalent cation.

---

The present invention relates to a process for the preparation of flame-resistant cellulosic salts. More particularly, it relates to a process for the preparation of water-insoluble cellulose sulfate salts which are flame-resistant.

A variety of methods for the preparation of water-soluble cellulose sulfate salts have been reported. These water-soluble salts, which are typically prepared by reacting sulfuric acid with cellulose in either an aliphatic acid or an alcohol, are employed as detergent aids, thickeners and in coating compositions.

It has been found, however, that the processes of the prior art cannot be employed to prepare a water-insoluble cellulose sulfate salt which can be made into flame and after-glow resistant paper.

Therefore, it is an object of the present invention to provide a process for the preparation of a water-insoluble, fibrous, cellulose sulfate salt.

It is another object of the present invention to provide a process for the preparation of a water-soluble cellulose sulfate salt having a particular degree of sulfate substitution and a particular distribution of sulfate groups so as to make said cellulosic material permanently flame-resistant.

It is still another object of the present invention to provide a water-insoluble, sulfated cellulose salt whose fibers have a reduced degree of swelling so that the fibers may be formed into paper by conventional means.

It is a further object of the present invention to provide a process for making a water-insoluble cellulose sulfate salt which is resistant to after-glow, i.e., flameless combustion.

Other objects and advantages of the present invention will become apparent from a reading of the following detailed description of the invention.

A water-insoluble, fibrous, flame-resistant cellulose sulfate salt results from a process which comprises a step of sulfating the cellulose-containing material in a sulfation bath, said sulfation bath consisting of a sulfating liquid, as the major portion or component of the bath, said liquid being selected from a group consisting of dimethyl sulfoxide and a dimethyl sulfoxide-dimethyl formamide mixture and as the minor portion or component of the bath, sulfur trioxide in complex with a Lewis base. The resulting water-insoluble cellulose sulfate is then subjected to the process steps of neutralization, washing with water, and de-swelling with a salt having a polyvalent cation. These latter process steps, namely, those subsequent to the sulfation step, can be performed in any sequence and, as such, are not to be deemed as being restricted to the order in which they are recited above. Also, some of these latter process steps can be combined into a single process step.

The final product is a water-insoluble mixed salt of cellulose sulfate. The resulting salt is referred to as a mixed salt since it contains one polyvalent cation and one monovalent cation. This salt is permanently flame-resistant and can be utilized in a variety of ways. It can, for example, be formed into paper, utilized in non-woven fabrics, or employed as an ion exchange resin or used in the manufacture of rayon. Other properties which the pulp has in addition to flame-resistance making it useful in all of the above described products are high yield, easy washability and good drainage.

Only by the use of from at least 50% to as much as 100%, by weight, of dimethyl sulfoxide as the sulfating liquid, in the sulfation bath, can a sulfated cellulose be obtained having a satisfactory degree of sulfate substitution and a particular distribution of sulfate groups so as to remain permanently flame-resistant. The sulfating liquid can, however, be a mixture of dimethyl sulfoxide and dimethyl formamide, provided that the percentage of dimethyl formamide present in the sulfation bath is always less than the percentage of dimethyl sulfoxide present. For example, the ratio of the dimethyl sulfoxide to the dimethyl formamide can be from about 51:49 to about 99:1, respectively, based upon parts by weight.

If only dimethyl formamide is employed as the sulfating liquid, both a water-soluble cellulose sulfate and a water-insoluble cellulose sulfate are obtained. The water-insoluble cellulose sulfate prepared in this fashion is flammable. When the concentration of sulfur trioxide is reduced so that no appreciable cellulose sulfate is made soluble in dimethyl formamide, the resulting product does not have a sufficient number of substituted sulfate groups so as to impart flame-resistance.

Illustrative of the cellulosic starting materials which can be employed are cotton, cotton linters, various wood pulps, wood flour, etc. The cellulose is, preferably, first dried to reduce the amount of water present prior to undergoing the sulfation reaction. However, cellulosic materials having a water or moisture content of up to approximately 10% can be employed. Even higher water contents may be used but it is uneconomical, since the water reacts to form sulfuric acid.

If it is desired to utilize a more activated cellulose, a pre-treatment step can be utilized effectively. This is accomplished by pre-treating the cellulose with either dimethyl sulfoxide or dimethyl formamide, both of which tend to swell the cellulosic material. This pre-treatment can be accomplished either by spraying a cellulosic sheet or shredding the dry sheet and treating it as a slurry. It should be understood, however, that activation or swelling of the cellulose only serves to assure a greater degree of effectiveness to the sulfating liquid when it reacts with the cellulose and, as such, such pre-treatment is optional only.

The minor portion or component of the sulfation bath is, as has been previously referred to, sulfur trioxide in complex with a Lewis base. The preferred Lewis bases are dimethyl sulfoxide and dimethyl formamide, and, accordingly, the preferred complexes are a dimethyl sulfoxide-sulfur trioxide complex or a dimethyl formamide-sulfur trioxide complex. The complexes can be prepared either in the form of a solution or in solid form. On a laboratory scale, liquid sulfur trioxide is added slowly with stirring to either dimethyl sulfoxide or dimethyl formamide at a temperature of from about 17° C. to about 20° C. The sulfur trioxide can also be added by employing an inert carrier gas to bubble in the liquid. Alternatively, the $DMSO-SO_3$ complex can be made by passing $SO_2$ into DMSO and oxidizing the $SO_2$ to $SO_3$ with an oxidizing agent such as $NO_2$.

In the sulfation of cellulose in accordance with the present invention, the ratio of sulfation bath to cellulose can be as little as 1 part of sulfation bath per part of cellulose up to 100 parts or more of bath per part of cellulose. The upper and lower limits of the sulfation bath are governed only by convenience of operation. Ordinarily, the ratio of sulfation bath to cellulose, based upon parts by weight, is within the range of from about 15.1 to about 30:1. The sulfation bath constituents may come either from activation of the cellluose, the solution of sulfur trioxide, or, more commonly, from both sources. The amount of sulfur trioxide added to the bath either as a solid complex or in solution is in the range of from about 0.20 to about 2.0 parts, by weight, per part of cellulose. The amount of dimethyl sulfoxide present is from about 3 parts to about 100 parts per part of cellulose, by weight. Sulfuric acid would also be present in the bath due to the reaction of sulfur trioxide with water. The amount of sulfuric acid present can be as high as 20% of the entire sulfation bath without having a deleterious effect on the reaction.

The reaction is preferably carried out at a temperature within the range of from about 10° C. to about 50° C. Higher temperatures can be used, but they result in a lower degree of sulfate substitution and a greater degree of cellulose degradation. A convenient time for running the reaction is one hour, although the use of higher temperatures may shorten the reaction time, whereas with lower temperatures the reaction can run for a longer period of time. The reaction should be run until the cellulose sulfate product has a combined sulfate content of at least 10% and preferably at least 15%, but less than 37%. A sulfate content in excess of 37% results in a water-soluble product.

After completion of the sulfation reaction, the cellulose sulfate should have a degree of sulfate substitution of from about 0.10 to about 1.0 per anhydroglucose unit. If the degree of sulfate substitution is in excess of 1.0, a water-soluble product results. If the degree of substitution is less than 0.10, the product is not permanently flame-resistant. Preferably, the degree of sulfate substitution should be from about 0.20 to about 0.40.

After sulfation has occurred, the cellulose sulfate is separated from the sulfation liquid by filtration or centrifugation and is washed with water to remove any remaining sulfation liquid. It is then treated with or immersed in a solution of a neutralizing agent having a monovalent cation which converts the product to a salt. Optionally, the sulfated cellulose may be partially or wholly converted to its salt prior to the washing step. The neutralizing agent can be selected from any alkali metal, alkyl amine, or ammonium compound, or any mixture thereof, which will replace the hydrogen of the cellulose sulfate with a cation. Exemplary of the compounds which can be employed are sodium hydroxide, sodium acetate, sodium carbonate, diethyl amine, aqueous ammonia and potassium hydroxide, or mixtures thereof. It is preferred to employ sodium hydroxide for the neutralization and pH adjustment. The neutralizing agent can be conveniently employed in a concentration of from about 2 to about 10%, by weight, although the treatment is not restricted to concentrations within this range.

Since the neutralized cellulose sulfate is highly swollen and slippery, it cannot, in this form, be converted into paper by conventional means. Accordingly, it has been found that if salts having a polyvalent cation are added thereto, the degree of swelling will be considerably diminished. Exemplary of the polyvalent cations which can be employed are the magnesium, ferric, zinc, mercuric, nickel, cobalt, cupric and aluminum ions. Aluminum, zinc, cupric and magnesium ions are preferred, since they have been found to be especially effective in de-swelling the neutralized sulfated cellulose and have the added benefit of making the product resistant to after-glow. A product possessing after-glow resistance will not support flameless combustion.

Aluminum ion has been found to be especially preferred in the process of the present invention and exemplary of the sources of aluminum ion which have been found to be satisfactory are aluminum sulfate, aluminum chloride, sodium aluminate, aluminum hydroxide, and alums, or mixtures thereof.

The addition of the aluminum salt and of either an alkali metal, alkyl amine or ammonium compound may be in any order. Usually the sulfated cellulose is neutralized with a 10% sodium hydroxide solution and is then washed with water. Then, a 10% solution of sodium hydroxide is added to from about 0.004 to about 0.04 part of aluminum per part of cellulose sulfate until a pH of from about 8.0 to about 10.0 is obtained. This mixture is then added to the neutralized and washed cellulose sulfate. The final pH is then preferably adjusted within the range of from about 3.0 to about 9.0, and even more preferably in the range of from about 3.0 to about 5.0. Alternatively, the species of aluminum ion employed can be added initially, immediately following the sulfating step, to the washed but unneutralized sulfated pulp, and the pH can then be adjusted with sodium hydroxide. The amount of aluminum added depends upon the degree of cellulose sulfate substitution and the ultimate end-use of the product. Excessive amounts of salt are simply washed out of the insoluble cellulose sulfate.

After completion of the various process steps, the ultimate or final product which is obtained is a fibrous mixed salt of cellulose sulfate which is insoluble in water. The cellulose sulfate salt contains a monovalent cation and a polyvalent cation. For example, if sodium hydroxide is used as the neutralizing agent and a source of aluminum ions are employed as the de-swelling agent in the process, as is preferred, the resulting salt is sodium aluminum cellulose sulfate.

The cellulose sulfate mixed salts prepared in accordance with the present invention are still in their fibrous form and, because of the presence of the polyvalent cation, the swollen and slipper nature of the fibers has been reduced so that the fibers may be readily formed into paper by conventional paper making equipment, such as, laboratory sheet molds, Four-drinier machines and cylinder machines. The final dried sheet is flame-resistant and when either aluminum, magnesium, zinc or cupric ions are employed, it is also after-glow resistant. The final dried sheet has good softness, bulk, absorbancy, porosity, opacity and is resistant to leaching in water.

EXAMPLE 1

Seventy-five milliliters of sulfur trioxide was slowly added to 1500 mls. of dimethyl sulfoxide at 17° C. 200 grams of bleached pine kraft pulp which was oven-dried to 2% moisture was slurried for one hour in one gallon of dimethyl sulfoxide. The dimethyl sulfoxide-sulfur trioxide complex was then added to the pulp dimethyl sulfoxide slurry and the reaction allowed to proceed for one hour at room temperature. Excess dimethyl sulfoxide, dimethyl sulfoxide-sulfur trioxide, and sulfuric acid formed from the reaction of sulfur trioxide and water were removed by filtering, and the cellulose sulfate was neutralized with 10% sodium hydroxide and washed with water. To 200 mls. of 10% aluminum chloride solution was added 300 mls. of 10% sodium hydroxide, and this mixture was added to the pulp. Final pH was adjusted to 3.8 with HCl, and excess salts were filtered off. Handsheets (42 lbs./3000 square feet) made from this pulp showed a char length of 3.0 inches and a glow-time of 10.3 seconds as established by TAPPI Standard T-461 05-68, which is a vertical flame test.

EXAMPLE 2

200 grams of bleached kraft pulp was sulfated, neutralized, and washed the same as in Example 1. Sodium hydroxide was added to 200 mls. of 0.8% papermaker's alum solution until the pH was 9.0. The solution was added to 10 grams of this cellulose sulfate in 500 mls. of 9.0 pH tap water. Handsheets (42 lbs./3000 square feet) made from the pulp showed a 2.1 inches char length and 7 seconds afterglow as established by the TAPPI test referred to in Example 1.

EXAMPLE 3

200 grams of bleached pine kraft pulp was sulfated as in Example 1, and excess dimethyl sulfoxide complex, and sulfuric acid was sucked off. The pulp was washed three times with water, and 147 mls. of 27.2% aluminum chloride solution was added. The pH was adjusted to 7.0 with sodium hydroxide, excess salts were filtered off, and the pulp was diluted to sheet-making consistency. Final pH was adjusted to 3.8 with HCl. Handsheets (42 lbs./3000 square feet) showed 2.3 inches char length and 0.7 second glow-time as established by the TAPPI test referred to in Example 1.

EXAMPLE 4

450 milliliters of sulfur trioxide was slowly added to 3000 milliliters of dimethyl formamide (DMF), and the DMF-sulfur trioxide crystals that were formed were separated from the liquid by filtration. 400 grams of bleached pine kraft pulp was oven dried and slurried in ten liters of dimethyl sulfoxide (DMSO) for one hour. One third of the DMF-sulfur trioxide crystals and one third of the filtrate were added to the pulp-DMSO slurry, and the reaction was allowed to go for one hour. The pulp was filtered, neutralized to alkaline pH with 10% sodium hydroxide solution, and washed three times with water. To 526 milliliters of 17.1% papermakers' alum was added 500 milliliters of 18% sodium hydroxide solution, and this mixture was added to the pulp. Final pH was brought to 3.8 with sulfuric acid. Handsheets were made using demineralized 7.0 pH water and tested in accordance with the TAPPI test referred to in Example 1.

Basis wt., lbs./3000 sq. ft. _____ 49.2
Caliper, 0.001 in. _____ 10.7
Flame resistance:
  After-glow, sec. _____ 5.0
  Char length, in. _____ 2.2

EXAMPLE 5

150 milliliters of sulfur trioxide was slowly added to 3000 milliliters of DMSO. 400 grams of bleached pine kraft pulp was oven dried and slurried for one hour in eight liters of a 2:1 mixture of DMSO and DMF. The DMSO-sulfur trioxide complex was added to the pulp, and the reaction was allowed to go for one hour. The sulfated pulp was then filtered, neutralized with 10% sodium hydroxide solution, and washed three times with water. 675 milliliters of 10% sodium hydroxide solution was added to 450 milliliters of 10% aluminum chloride solution, and this mixture was added to the pulp. Final pH was adjusted to 3.8 with sulfuric acid. Handsheets were made using 7.0 pH demineralized water and tested in accordance with the TAPPI test referred to in Example 1.

Basis wt., lb./3000 sq. ft. _____ 41.0
Caliper, 0.001 in. _____ 11.1
Flame resistance:
  After-glow, sec. _____ 2.9
  Char length, in. _____ 1.7

EXAMPLE 6

150 milliliters of sulfur trioxide was added to 3000 milliliters of DMSO. 400 grams of bleached pine kraft pulp was oven dried and slurried in eight liters of DMSO for one hour. The DMSO-sulfur trioxide mixture was added to the pulp, and the reaction allowed to go for one hour. The pulp was filtered, neutralized with 10% sodium hydroxide solution, and washed three times with water. The sulfated pulp was filtered to 14.7% consistency. Samples of this pulp were treated as follows:

(a) 50 milliliters of distilled water was added to 1.52 grams of $MgCl_2 \cdot 6H_2O$. 7.5 milliliters of 10% sodium hydroxide solution was added to the magnesium chloride solution. 153 milliliters of distilled water was added to 40 grams of pulp (14.7% consistency), and the magnesium solution was added to the pulp.

(b) 50 milliliters of distilled water was added to 1.02 grams of $ZnCl_2$. 7.5 milliliters of 10% sodium hydroxide solution was added to the zinc chloride solution. 153 milliliters of distilled water was added to 40 grams of the pulp (14.7% consistency), and the zinc solution was added to the pulp.

(c) 50 milliliters of distilled water was added to 1.28 grams of $CuCl_2 \cdot 2H_2O$. 7.5 milliliters of 10% sodium hydroxide solution was added to the copper chloride solution. 153 milliliters of distilled water was added to 40 grams of the pulp (14.7% consistency), and the copper solution was added to the pulp.

Samples (a), (b) and (c), above, were each tested in accordance with the TAPPI test referred to in Example 1.

| | | | Flame resistance | |
|---|---|---|---|---|
| | Basis wt., lb./ 3,000 sq. ft. | Caliper, 0.001 in. | After- glow, sec. | Char length, in. |
| Sample: | | | | |
| (a) | 37.5 | 6.7 | 6.8 | 2.7 |
| (b) | 31.2 | 6.2 | 3.3 | 2.4 |
| (c) | 36.4 | 7.4 | 10.3 | 2.6 |

What is claimed is:

1. A process for preparing a permanently flame-resistant, water-insoluble, fibrous cellulose sulfate salt, which comprises a step of sulfating a fibrous cellulose-containing material with from about 1.0 to about 100 parts of a sulfating liquid selected from the group consisting of dimethyl sulfoxide and a dimethyl sulfoxide-dimethyl formamide mixture, the ratio of said dimethyl sulfoxide to said dimethyl formamide in said mixture being from about 51:49 to about 99:1, respectively, based upon parts by weight, in the presence of from about 0.2 to about 2.0 parts sulfur trioxide in complex with a compound selected from the group consisting of dimethyl sulfoxide and dimethyl formamide at a temperature of from about 10° C. to about 50° C. to produce a water-insoluble cellulose sulfate having a degree of sulfate substitution of from about 0.1 to about 1.0, a step of neutralizing the resulting water-insoluble cellulose sulfate with a compound selected from the group consisting of alkali metal compounds, alkyl amines and ammonium compounds, or mixtures thereof, a step of washing said water-insoluble cellulose sulfate with water, and a step of deswelling said water-insoluble cellulose sulfate salt by reacting it with a salt having a polyvalent cation selected from the group consisting of magnesium, ferric, zinc, mercuric, nickel, cobalt, cupric and aluminum ions, or mixtures thereof, to form a mixed water-insoluble salt of cellulose sulfate.

2. The process as recited in claim 1 wherein the washing step precedes the neutralization step.

3. The process as recited in claim 1 wherein the deswelling step follows immediately after the sulfating step.

4. The process as recited in claim 1 wherein the neutralization step follows the de-swelling step.

5. The process as recited in claim 1 wherein the neutralization is effected by a compound selected from the group consisting of sodium hydroxide, sodium acetate, sodium carbonate, potassium carbonate, and aqueous ammonia, or mixtures thereof.

6. The process as recited in claim 1 wherein the sulfating liquid is dimethyl sulfoxide.

7. The process as recited in claim 1 wherein the salt having a polyvalent cation is selected from the group consisting of aluminum sulfate, aluminum chloride, aluminum hydroxide, sodium aluminate and alums, or mixtures thereof.

8. A permanently flame-resistant fibrous cellulosic product which comprises a water-insoluble cellulose sulfate salt having a degree of sulfate substitution of from about 0.1 to about 1.0 per anhydroglucose unit, said cellulose sulfate salt being a mixed salt of cellulose sulfate containing a monovalent cation selected from the group consisting of alkali metals, alkyl amines and ammonium compounds, or mixtures thereof, and a polyvalent cation selected from the group consisting of magnesium, ferric, mercuric, nickel, cobalt, cupric, and aluminum, or mixtures thereof.

9. The product as recited in claim 8 wherein said monovalent cation is sodium and said polyvalent cation is aluminum.

References Cited

UNITED STATES PATENTS

| | | | |
|---|---|---|---|
| 2,776,912 | 1/1957 | Gregory | 117—62 |
| 3,045,006 | 7/1962 | Gerbaux et al. | 260—224 |
| 3,341,516 | 9/1967 | Savage et al. | 260—232 |
| 2,511,229 | 6/1950 | Thomas | 260—215 |

HOSEA E. TAYLOR, Primary Examiner

R. W. GRIFFIN, Assistant Examiner

U.S. Cl. X.R.

117—140, 152; 260—2.1